(12) United States Patent
Jensen et al.

(10) Patent No.: US 6,220,640 B1
(45) Date of Patent: Apr. 24, 2001

(54) DEVICE AND METHOD OF GRIPPING A COMPACT DISC (75) Inventors: Steven R. Jensen, Ramsey; Westiin W. Nelson, Dayton, both of MN (US)

(73) Assignee: Rimage Corporation, Minneapolis, MN (US)

( * ) Notice: Subject to any disclaimer, the term of this patent is extended or adjusted under 35 U.S.C. 154(b) by 0 days.

(21) Appl. No.: 09/396,278

(22) Filed: Sep. 15, 1999

(51) Int. Cl.[7] ..................................................... B25J 15/00
(52) U.S. Cl. ............................................. 294/93; 294/100
(58) Field of Search ................................. 294/15, 16, 93, 294/94, 100, 158; 279/2.1, 2.17, 2.22; 414/908

(56) References Cited

U.S. PATENT DOCUMENTS

| | | | |
|---|---|---|---|
| 3,083,813 | * | 4/1963 | Lusher ..................................... 294/94 |
| 3,574,381 | * | 4/1971 | Ocheltree ............................... 294/94 |
| 4,173,368 | * | 11/1979 | Haverbusch ........................... 294/93 |
| 5,195,794 | * | 3/1993 | Hummel, Jr. et al. ................. 294/94 |
| 5,542,526 | * | 8/1996 | Wurgler .................................. 294/93 |
| 5,713,618 | * | 2/1998 | Kocsis ..................................... 294/93 |

FOREIGN PATENT DOCUMENTS 217-778 * 1/1985 (DE) ......................................... 294/93

* cited by examiner

Primary Examiner—Dean J. Kramer
(74) Attorney, Agent, or Firm—Fogg, Slifer & Polglaze, P.A.; Russell D. Slifer (57) ABSTRACT

A compact gripping device includes a spring that can be retracted to retract ends of the spring via application of a force. The force can be either a downward (push) or upward (pull) force. The spring ends are retracted by removing the force. The spring engages a compact disc either by gripping an inside surface of a hole provided in the compact disc, or by contacting a bottom surface of the compact disc. An embodiment which grips the inside surface of the compact disc allows the compact disc to be axially rotated by the gripper, while the gripper which grips the bottom surface of the compact disc allows for multiple discs to be gripped at one time.

26 Claims, 7 Drawing Sheets

UNDEFLECTED

FIG. 11A

DEFLECTED

DEVICE AND METHOD OF GRIPPING A COMPACT DISC

TECHNICAL FIELD OF THE INVENTION

The present invention relates generally to compact discs and in particular the present invention relates to a device and method for gripping a compact disc for subsequent processing operations.

BACKGROUND OF THE INVENTION

Data is often stored on compact discs for use with information processing systems such as computers. Other types of data such as audio and video entertainment data can also be stored on compact discs for use with entertainment equipment. Both types of data are stored on compact disc by altering the optical characteristics of the compact discs. That is, a compact disc is read by monitoring a reflection of a light, such as a laser, which is focused on the compact disc.

One way of manufacturing a compact disc is to mold the compact disc using a plastic mold press. Each plastic mold is configured with the data such that each compact disc manufactured from the plastic mold is identical. This type of compact disc can not be programmed after manufacturing. Other types of compact discs are manufactured without data stored thereon. These types of compact discs can be custom programmed after manufacturing with data selected by a programmer. These compact discs are often referred to as recordable compact discs. Recording devices are commonly available in the industry to store selected data on recordable compact discs.

Figure 1:
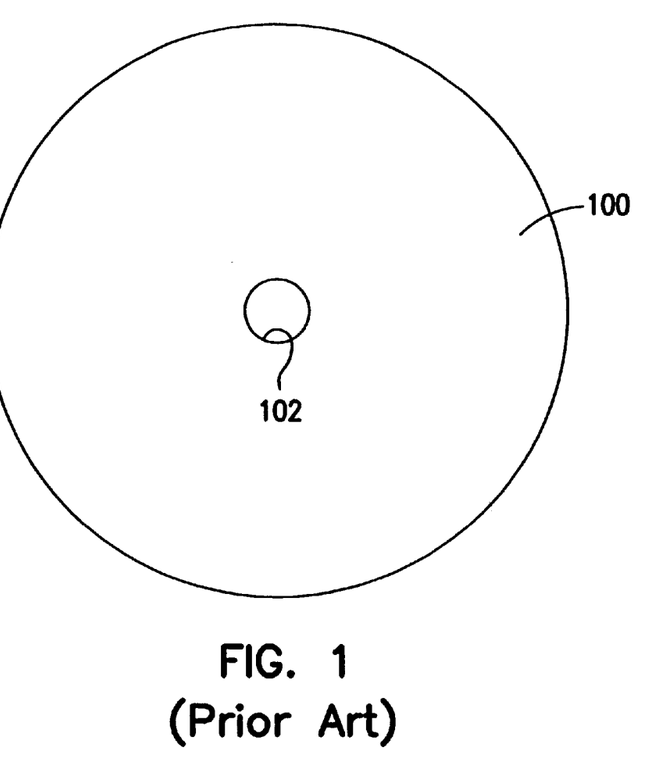
FIG. 1 is a top view of a prior art compact disc.
Figure 2:
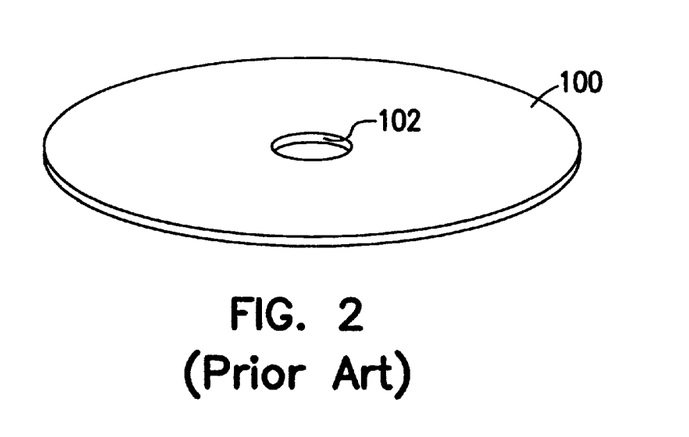
FIG. 2 is a perspective view of the compact disc of FIG. 1.

The recordable compact discs, therefore, are useful when a small production run of compact discs needs to be provided with specific data. That is, fabricating a plastic mold is not economically feasible for small production volumes of compact discs with a specific data content. Processing equipment has been described which can transport an un-recorded compact disc to a recorder and a printer for printing information or a label on the compact disc. For example, see U.S. Pat. No. 5,734,629 entitled "CD Transporter" for a description of a device which allows for automated processing of recordable compact discs. As described therein, a compact disc gripper head can be used which includes three fingers that expand and retract to grip the compact disc. FIGS. 1 and 2 illustrate top and perspective views of a compact disc 100. The compact disc includes an axially positioned circular opening 102. As described in U.S. Pat. No. 5,734,629 this circular opening is used to grip the CD using the three expandable fingers. The described gripper is relatively complicated and includes numerous moving parts. Further, this style of gripper does not allow for movement of a stack of numerous compact discs at one time.

For the reasons stated above, and for other reasons stated below which will become apparent to those skilled in the art upon reading and understanding the present specification, there is a need in the art for a simplified device with a reduced number of moving parts which can be used to grip one or more compact discs.

SUMMARY OF THE INVENTION

The above mentioned problems with gripping compact discs and other problems are addressed by the present invention and will be understood by reading and studying the following specification.

In one embodiment, a disc gripping device comprises a body, and a deflectable spring located in the body. The spring has a first length when the spring is in an undeflected state and a second length when the spring is in a deflected state. In the undeflected state the spring extends outside of the body. A force member is located in the body and coupled to the spring to provide a deflection force to the spring. In another embodiment, the spring extends in response to a deflecting force.

In another embodiment, a disc gripping device comprises a body having a substantially circular cross section, a tip connected to the body, and a flat deflectable spring located between the body and the tip and extending radially with respect to the body. The spring has first and second ends, and has a first length between the first and second ends when the spring is in an undeflected state and a second length when the spring is in a deflected state. In the undeflected state the first and second ends of the spring extend beyond an outside surface of the body. A rod axially extends through the body and is coupled in a substantially perpendicular position to the spring to provide a deflection force to the spring.

A method is provided for gripping a compact disc using a disc gripping device comprising a deflectable spring and a rod coupled to the spring to provide a deflection force to the spring. The method comprises retracting ends of the spring, positioning the spring in an opening of the compact disc, and extending the ends of the spring to grip an interior surface of the opening.

A second method is also provided for gripping a compact disc using a disc gripping device comprising a deflectable spring and a rod coupled to the spring to provide a deflection force to the spring. The method comprises retracting ends of the spring, positioning the spring below an opening of the compact disc, and extending the ends of the spring to extend radially beyond the opening to allow the ends of the spring to contact a bottom surface of the contact disc.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims. The term "grip" as used herein should be construed as meaning "having contact with" or engaging, and should not be limited to some type of physical squeezing or pinching of a compact disc. The amount of contact can vary depending upon the embodiment employed.

Figure 3:
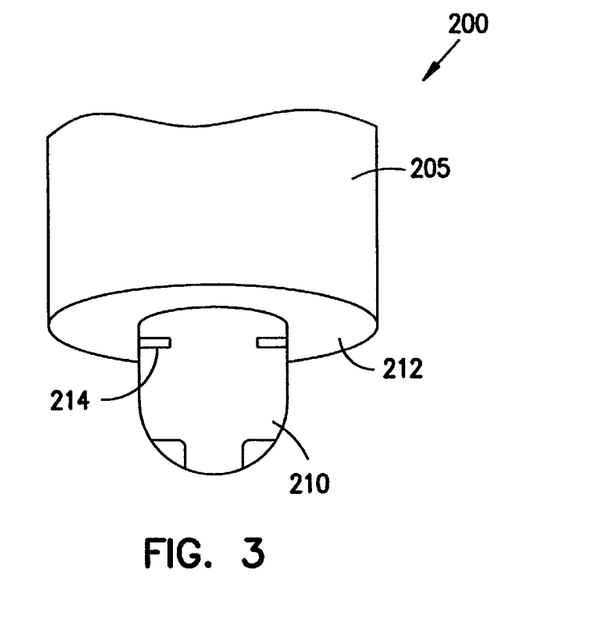
FIG. 3 is a perspective view of a gripper head according to one embodiment of the present invention.

Referring to FIG. 3, a compact disc gripper head 200 according to one embodiment of the present invention is illustrated. The gripper head includes a body 205 and a tip 210. A shoulder 212 is defined by a bottom of the body to make contact with a compact disc, as described in detail below. The tip can be circular in cross-section and sized to fit within the circular opening 102 of the compact disc. Commercially available compact discs typically have a circular opening having an diameter of 0.590 in. In one embodiment, the gripper head tip has an outside diameter of 0.585 in. to provide a clearance of 0.005 in. between the gripper head tip and the compact disc. A deflectable spring 214 is located within the gripper head for gripping compact discs.

Figure 4:
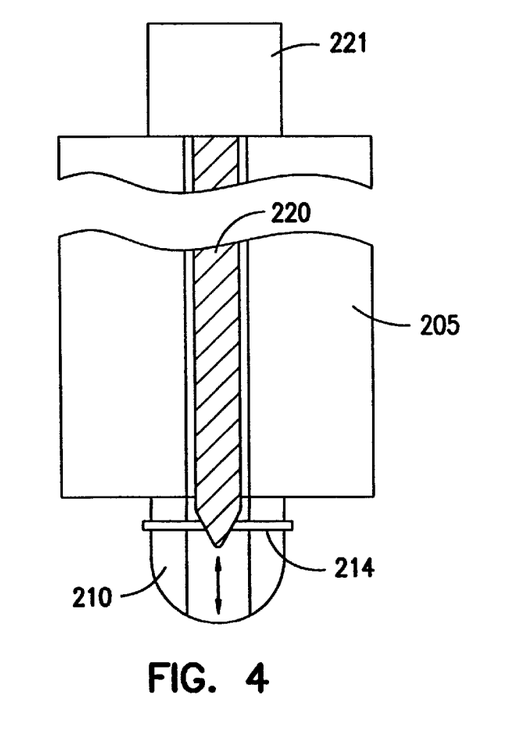
FIG. 4 is a cross-section view of the gripper head of FIG. 3.

Prior to explaining the operation of the gripper head, a vertical cross section of the gripper head is described with reference to FIG. 4. The gripper head includes a rod 220 which can be automatically or manually moved in either a push or pull vertical motion. The term rod is used to describe any mechanism which can transfer either a push or pull force. This can include, but is not limited to, a rigid length of material having any cross-section shape. For example, a round or square length of metal. The term force member is also interchangeably used herein with rod to describe any force applying member.

The rod is coupled to spring 214 in a substantially perpendicular relationship. In one embodiment, a solenoid 221 is used to provide the vertical motion of the rod. Because the rod and spring are connected, the vertical movement of the rod is imparted to the spring. In one embodiment, the end of the rod that is coupled to the spring is tapered and fits within a hole provided in the spring.

Figure 5:
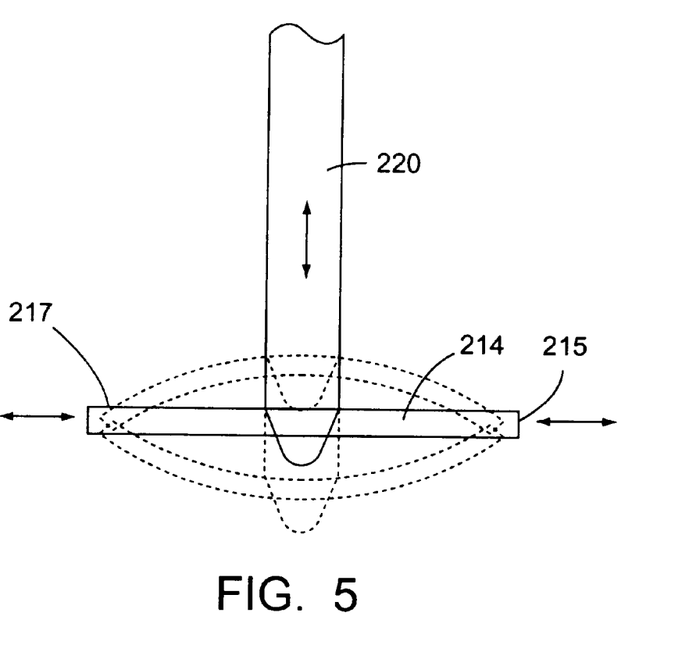
FIG. 5 provides an isolated view of components of the gripper of the present invention.

Referring to FIG. 5, rod 220 and spring 214 are illustrated in more detail. The rod can be coupled to the spring as described using a tapered end. This embodiment allows the rod to push down on the spring. As illustrated, the spring is supported to allow the center region of the spring to deflect downwardly. Ends 215 and 217 of the spring are pulled in as the spring is deflected. When a downward force is removed from the rod, the spring can push the rod vertically up so that the spring returns to its original flat condition. In an alternate embodiment, the rod is coupled to the spring such that the rod can pull on the spring. That is, a screw, or other fastener, can extend upwardly through the spring to attach to the rod. Additionally, the end of the rod can be configured with a circumferential groove, or other similar feature, to anchor to the spring to reduce part count (screws). In operation, the rod pulls up on the spring to deflect the center region and pull the ends of the spring inward. When the upward force is removed from the rod, the spring can pull down on the rod to return to its original flat position.

Figure 6:
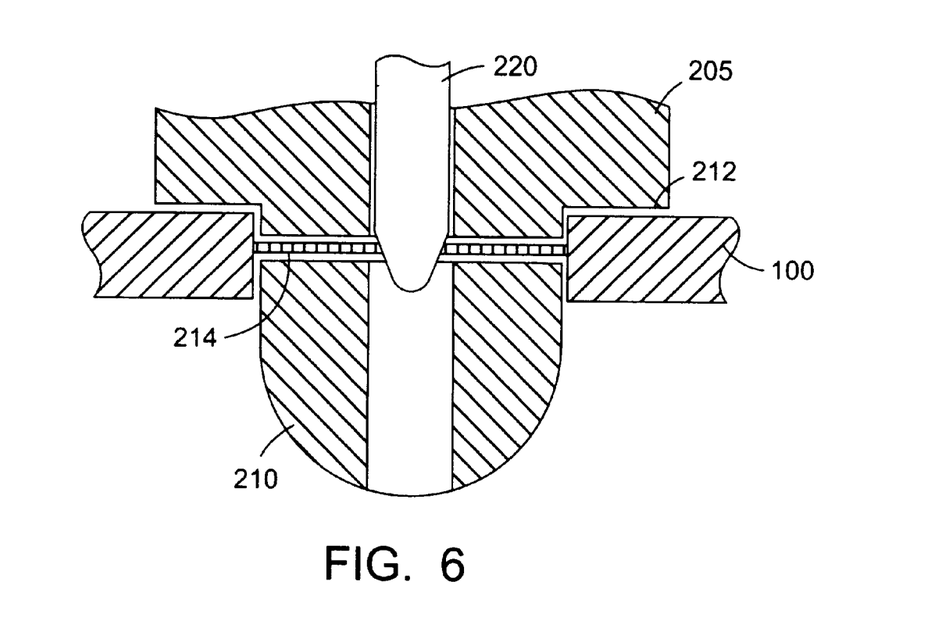
FIG. 6 is a cross-section view of a gripper head engaged with a disc.

As explained, the ends of the spring retract when a deflection force is exerted on it by the rod. By selecting the proper length of die spring and the amount of deflection, the spring can be used to grip the circular opening 102 of a compact disc. FIG. 6 illustrates a cross-section of a gripper head in combination with a compact disc. Tip 210 of the gripper head is extended through opening 102 of a compact disc 100. The rod is vertically moved to pull the ends of the spring inward. Shoulder 212 of gripper body 205 comes in contact with a top surface of compact disc 100 and vertically positions the ends of spring 214 within the compact disc. In one embodiment, the spring is located 0.035 inches below the shoulder. The rod is then released and the ends of the spring extend from the gripper head and anchor, or grip, the inside wall surface of opening 102.

The length of the spring, in both its normal and deflected states, is important. As stated above, the typical diameter of opening 102 is 0.590 inches. In one embodiment, the spring has a length of 0.601 inches in an extended position and an approximate end-to-end length of 0.585 inches when deflected. It is noted that the actual length of the spring does not change when the spring is deflected, but the distance between ends, or contact points, changes. The deflected end-to-end length can vary, but needs to be less than the inside diameter of the compact disc. The length of the spring is defined herein as a distance between contact points of the spring. Thus, contact points for a flat ended (rectangular) spring will have a length defined by opposite corners, see FIGS. 7A–7D explained below. The deflection distance of the center region of the spring will depend upon the material used and could be in the range of 0.004 to 0.050 inches from a flat position. The spring can be fabricated from any resilient material, such as, but not limited to, spring steel, carbon fiber, plastics or composites. The material characteristics should be considered to avoid deflecting the spring beyond its yield point. In one embodiment, two or more springs can be stacked together to provide a stronger return of the rod, but not deform under stress by the rod.

Figure 7A:
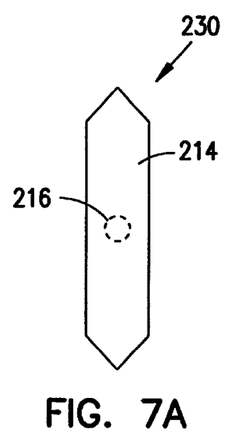
FIG. 7A is a top view of one possible spring embodiment.
Figure 7B:
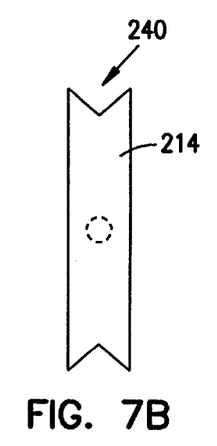
FIG. 7B is a top view of one possible spring embodiment.
Figure 7C:
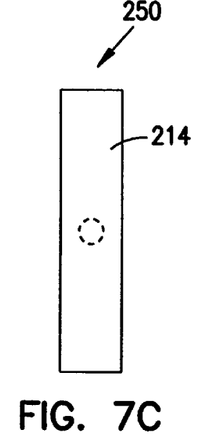
FIG. 7C is a top view of one possible spring embodiment.
Figure 7D:
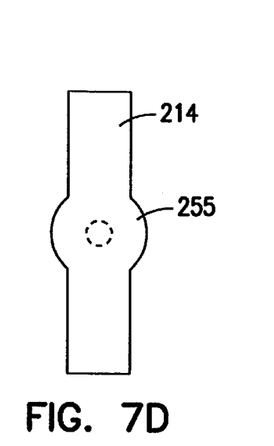
FIG. 7D is a top view of one possible spring embodiment.

Because the gripper head can be used in equipment where the compact disc may need to be rotated about its axis, the spring can be selected to have different end configurations to dig into the disc. FIGS. 7A to 7D illustrate some of the possible shapes of the spring. FIG. 7A is a spring 214 having an optional hole 216 (shown in dotted line) for coupling to a rod. The spring includes a single point at each end 230 (two contact locations). The hole is optional because some embodiments may have the rod in contact with the spring, but not attached thereto. The spring of FIG. 7B has V-shaped ends such that each end 240 includes two points (four contact locations). The spring of FIG. 7C has flat ends 250. The flat ends provide four contact locations. The spring of FIG. 7D has flat ends and a reinforced center region 255 to reduce potential fracture locations around the center opening.

Figure 8A:
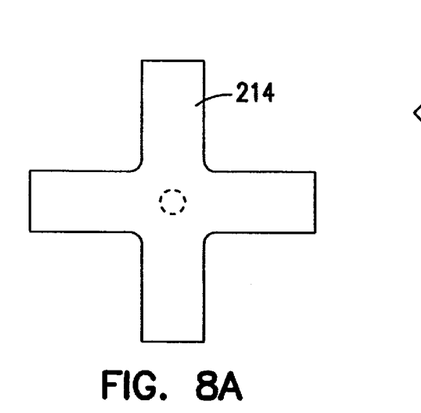
FIG. 8A is a top view of one possible spring embodiment.
Figure 8B:
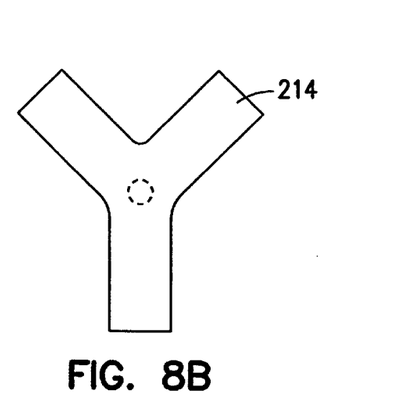
FIG. 8B is a top view of one possible spring embodiment.

FIG. 8A and 8B illustrate springs which have multiple ends. The spring of FIG. 8A is formed as a cross with four ends and the spring of FIG. 8B is formed in a Y-shape and has three ends. The ends can be flat or shaped as shown above. It is apparent that variations in the spring shape can be provided without departing from the invention For example, two rectangular springs can be used to form a cross.

Figure 9:
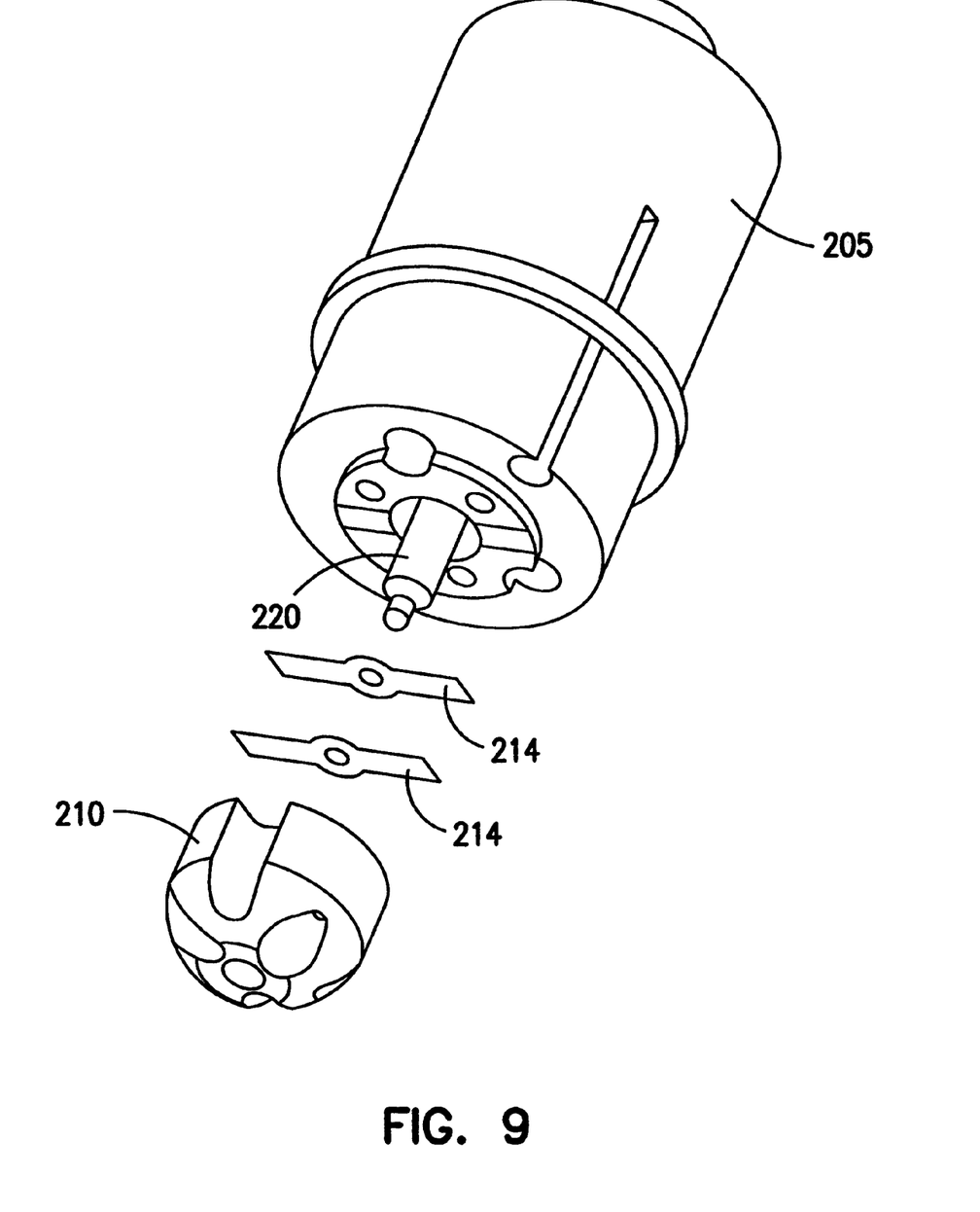
FIG. 9 is an exploded view of a gripper head according to one embodiment of the present invention.

FIG. 9 shows a perspective exploded view of a gripper having a body 205, tip 210, rod 220 and two springs 214. The springs are stacked on top of each other to form a laminated spring. This embodiment provides for a strong return of the rod, while avoiding excess stress on the spring. That is, a single thick spring could be used to provide a strong return force, but could fracture during repeated deflection faster than two thinner springs.

Figure 10A:
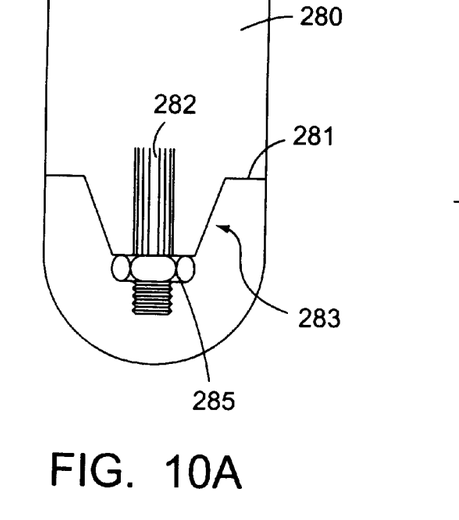
FIGS. 10A and 10B illustrate an alternate embodiment of a gripper.
Figure 10B:
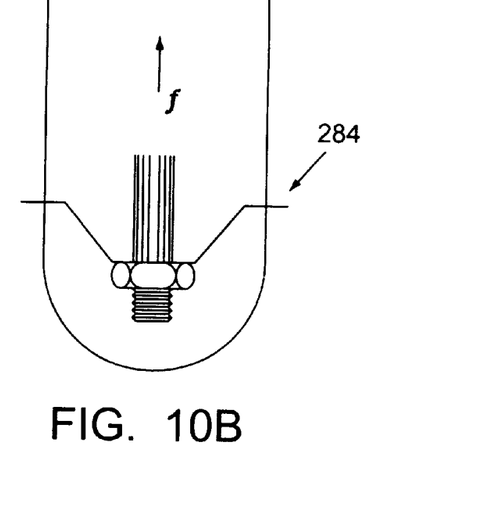
Figure 11A:
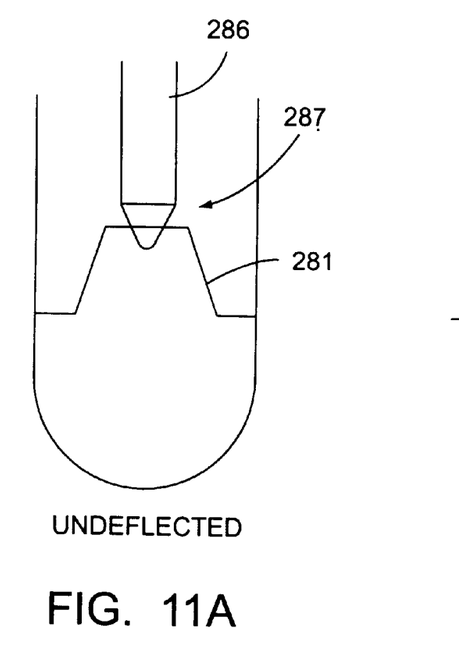
FIGS. 11A and 11B illustrate an alternate embodiment of a gripper.
Figure 11B:
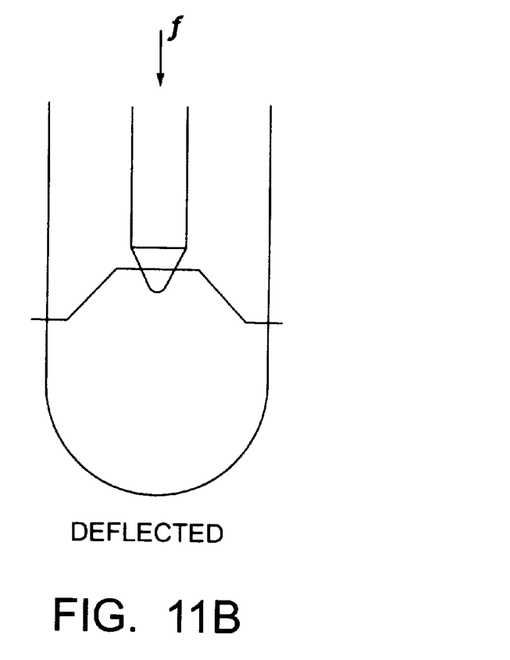

FIGS. 10A, 10B, 11A and 11B illustrate embodiments where a spring is deflected to extend outside of the body of the gripper. That is, the above described embodiments deflect the spring to retract the ends in side the body while these embodiments deflect the spring to extend the ends of the spring. FIGS. 10A and 10B illustrate a spring 281 which is formed with a bend 283. A rod 282 is attached to the spring with a mechanical fastener, such as nut 285. In the undeflected state the ends of the spring are retracted inside the body 280, FIG. 10A. When the rod is pulled up, the spring is deflected such that the ends of the spring extend from the body. FIGS. 11A and 11B illustrate a similar embodiment where a rod 286 having an end 287 pushes down on the spring to create a deflection to extend the spring ends.

The gripper heads described above can be used to grip a single compact disc. The rod can be operated either automatically with a motor or solenoid, or the like. The gripper could also be operated by physically moving the rod by a person. If one or more compact discs need to be gripped at one time, another embodiment of the present invention provides a longer spring which can extend beyond the opening in the compact disc. These embodiments are used to pickup a compact disc located on a top of a stack. Another embodiment can be provided to pickup more than one compact disc, such as a stack of discs.

Figure 12:
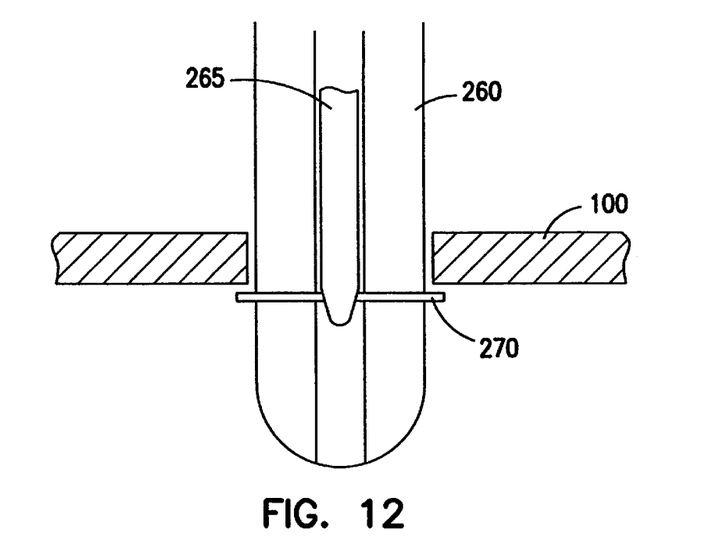
FIG. 12 a cross-section view of an alternate gripper head.
Figure 13:
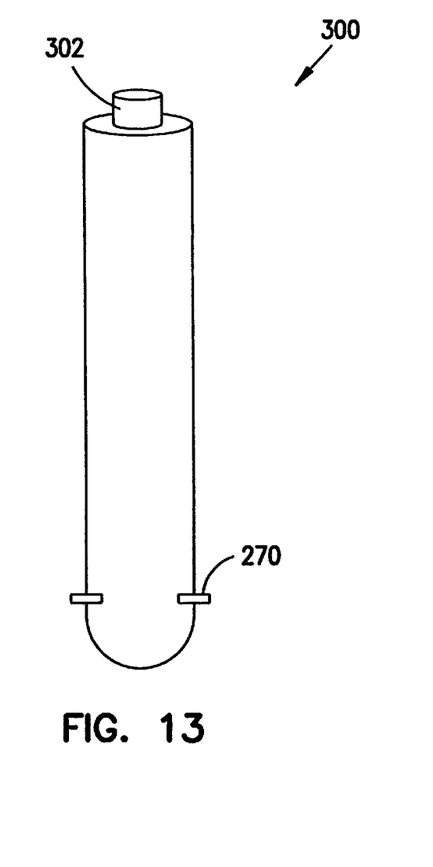
FIG. 13 is a perspective view of a disc gripping apparatus including the gripper head of FIG. 10.

Referring to FIG. 12, a cross-section view of a gripper which has a longer spring is illustrated. The spring 270 has a length which extends beyond the opening in the compact disc. In one embodiment, the spring has an undeflected end-to-end length of approximately 0.612 inches. In a deflected state, the spring passes through the disc opening. The spring is then extended (remove deflection force) and can engage a bottom of the disc. A shoulder, therefore, is not provided to position the spring inside of the disc. Further, the ends of the spring do not engage the inside surface of a disc opening and can be any desired shape. Although one disc is illustrated, this embodiment can be used to pick up, or grip, numerous discs which are stacked in axial alignment. The gripper includes a body 260, rod 265 and the spring 270. As shown in FIG. 13, a top of a gripper 300 can be provided with a button 302 which can be depressed downward by a user to retract the spring. The button can be a top end of rod 265, or a separate component.

Conclusion

Compact gripping devices have been described which include a spring that can be retracted to retract ends of the spring via a force applied to the spring. The force can be either a downward (push) or upward (pull) force. The spring ends are extended by applying the force. The spring then engages a disc either by gripping an inside surface of the disc, or by engaging a bottom surface of the disc. The embodiment which grips the inside surface of the disc allows the disc to be axially rotated by the gripper, while the gripper which engages the bottom surface of the disc allows for multiple discs to be gripped at one time.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A disc gripping device comprising:
   a body;
   a horizontally extending deflectable spring located in the body, the spring has a retracted state such that the spring does not extend outside of the body and an extended state such that the spring extends outside of the body; and
   a force member located in the body and coupled to the spring to provide a vertical force to the spring to place the spring in the retracted state, wherein a vertical thickness of the deflectable spring does not change in response to the vertical force.

2. The disc gripping device of claim 1 wherein the body has a substantially circular cross-section in the location of the spring.

3. The disc gripping device of claim 1 wherein a length of the spring in the extended state is larger than a diameter of a hole provided in a disc to allow the spring to grip an inside surface of the hole.

4. The disc gripping device of claim 1 wherein the spring has two or more ends.

5. The disc gripping device of claim 1 wherein the body includes a shoulder to position the spring in a predetermined vertical position relative to a disc engaged by the disc gripping device.

6. A disc gripping device comprising:
   a body;
   a deflectable spring located in the body the spring has a retracted state such that the spring does not extend outside of the body and an extended state such that the spring extends outside of the body, wherein the spring has two or more ends and wherein at least one of the two or more ends has one or more points; and a force member located in the body and coupled to the spring to provide a force to the spring to place the spring in the extended state.

7. A disc gripping device comprising:

a body;

first and second deflectable springs located in the body wherein the first spring is vertically positioned above the second spring, the first and second springs have a retracted state such that the springs do not extend outside of the body and an extended state such that the springs extend outside of the body; and a force member located in the bode and coupled to the springs to provide a force to the springs to place the springs in the extended state.

8. A disc gripping device comprising:

a body having a substantially circular cross section;

a tip connected to the body;

a flat deflectable spring located between the body and the tip and extending radially with respect to the body, the spring has first and second ends, and has a first length between the first and second ends when the spring is in an retracted state and a second length when the spring is in an extended state, in the extended state the first and second ends of the spring extend beyond an outside surface of the body; and a force member axially extending through the body and coupled in a substantially perpendicular position to the spring to provide a force to the spring.

9. The disc gripping device of claim 8 wherein in the retracted state the first and second ends of the spring retract inside of the body.

10. The disc gripping device of claim 8 wherein the force member applies the force to place the spring in the retracted state.

11. The disc gripping device of claim 8 wherein the force member applies the force to place the spring in the extended state.

12. A method of gripping a compact disc using a disc gripping device comprising a horizontally extending deflectable spring and a force member coupled to the spring to provide a vertical force to the spring, the method comprising:

retracting ends of the spring by applying the vertical force using the force member to deflect a center region of the spring;

positioning the spring in an opening of the compact disc; and extending the ends of the spring by removing the vertical force applied with the force member to grip an interior surface of the opening.

13. A method of gripping a compact disc using a disc gripping device comprising a deflectable spring and a force member coupled to the spring to provide a force to the spring, the method comprising:

retracting ends of the spring;

positioning the spring in an opening of the compact disc; and extending the ends of the spring to grip an interior surface of the opening wherein at least one of the ends of the spring include at least one point which engages the interior surface of the opening.

14. The method of claim 13 wherein positioning the spring comprises positioning a shoulder of the disc gripping device in contact with a top surface of the compact disc.

15. The method of claim 13 wherein retracting the ends of the spring comprises providing a force to the spring via the force member.

16. The method of claim 13 wherein extending the ends of the spring comprises removing the force from the spring.

17. A method of gripping a compact disc using a disc gripping device comprising a body, a substantially flat horizontally extending deflectable spring and a force member coupled to the spring to provide a vertical force to the spring the method comprising: positioning the spring in an opening of the compact disc when ends of the spring are retracted within the body, applying the vertical force to the spring; and extending the ends of the spring outside the body in response to the applied vertical force to grip an interior surface of the opening.

18. A disc gripping device comprising:

a body;

a horizontally extending deflectable spring located in the body, the spring has a retracted state such that the spring does not extend outside of the body and a extended state such that the spring extends outside of the body; and a force member located in the body and coupled to the spring to provide a vertical force to the spring to place the spring in the extended state, wherein a vertical thickness of the deflectable spring does not substantially change in response to the vertical force.

19. A disc gripping device comprising:

a body;

a horizontally extending deflectable spring located in the body, the spring has a retracted state such that the spring does not extend outside of the body and a extended state such that the spring extends outside of the body, wherein the spring comprises at least first and second ends, wherein each end comprises at least one point; and a force member located in the body and coupled to the spring to provide a vertical force to the spring to place the spring in the extended state.

20. A disc gripping device comprising:

a body;

a deflectable spring located in the body, the spring has a retracted state such that the spring does not extend outside of the body and an extended state such that the spring extends outside of the body, wherein the spring has two or more ends and wherein at least one of the two or more end has one or more points; and a force member located in the body and coupled to the spring to provide a force to the spring to place the spring in the retracted state.

21. A disc gripping device comprising:

a body having a substantially circular cross section;

a flat deflectable spring positioned in the body and extending radially with respect to the body, the spring has first and second ends, and has a first length between the first and second ends when the spring is in an retracted state and a second length when the spring is in an extended state, in the extended state the first and second ends of the spring extend beyond an outside surface of the body, and a force member axially extending through the body and coupled in a substantially perpendicular position to the spring to provide a force to the spring.

22. A gripping device comprising:

a vertically extending body;

a rod vertically extending positioned in a center region of the body; and a deflectable spring horizontally positioned in the body and in contact with the rod, the spring has first and second ends that define a first circumference, wherein the first and second ends define a second circumference that is smaller than the first circumference when a vertical force is applied to the spring by the rod to vertically deflect a center region of the spring.

23. The gripping device of claim 22 wherein the rod provides a downward vertical force on the spring.

24. A gripping device comprising:

a vertically extending body;

a rod vertically extending positioned in a center region of the body; and a deflectable spring horizontally positioned in the body and in contact with the rod, the spring has first and second ends that define a first circumference, wherein the first and second ends define a second circumference that is larger than the first circumference when a vertical force is applied to the spring by the rod to vertically deflect a center region of the spring.

25. The gripping device of claim 24 wherein the rod provides a downward vertical force on the spring.

26. A disc gripping device comprising:

a body;

first and second deflectable springs located in the body, wherein the first spring is vertically positioned above the second spring, the first and second springs have a retracted state such that the springs do not extend outside of the body and an extended state such that the springs extend outside of the body; and a force member located in the body and coupled to the springs to provide a force to the springs to place the springs in the retracted state.

* * * * *